Figure 1:
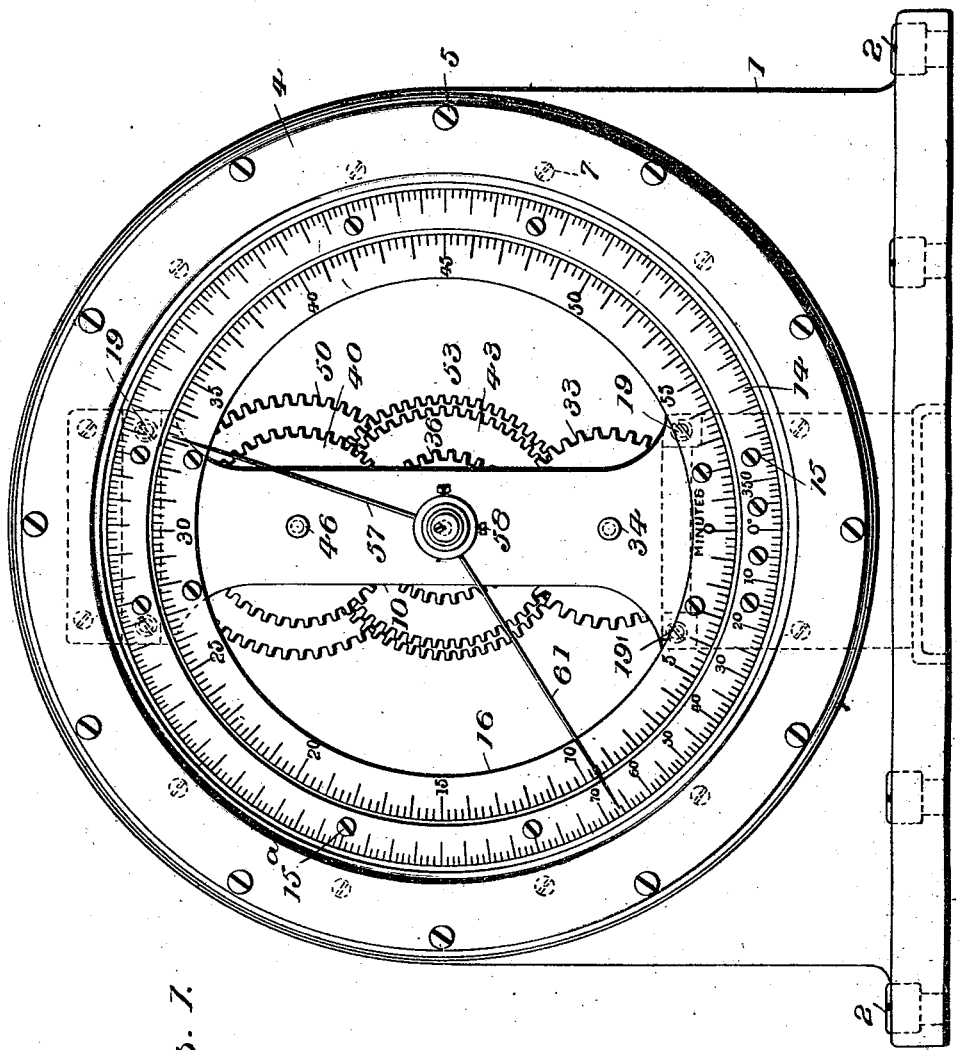

No. 669,898. Patented Mar. 12, 1901.
A. H. EMERY.
GUN CARRIAGE TRAVERSE INDICATOR.
(Application filed Feb. 1, 1901.)
(No Model.) 3 Sheets—Sheet 1.

Witnesses

Inventor
Albert H. Emery
By Knight Bros.
Attorneys

No. 669,898. Patented Mar. 12, 1901.
A. H. EMERY.
GUN CARRIAGE TRAVERSE INDICATOR.
(Application filed Feb. 1, 1901.)
(No Model.) 3 Sheets—Sheet 2.
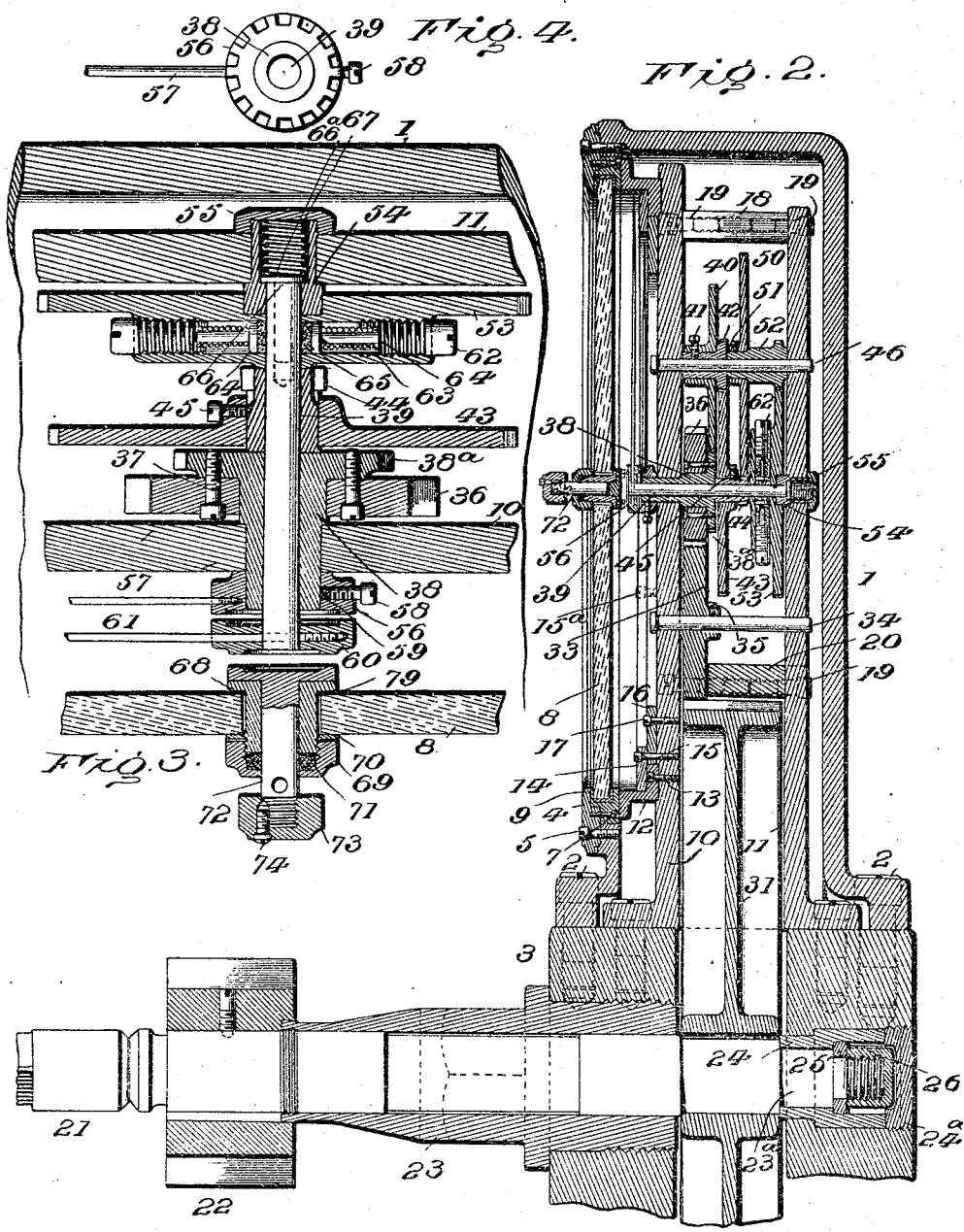

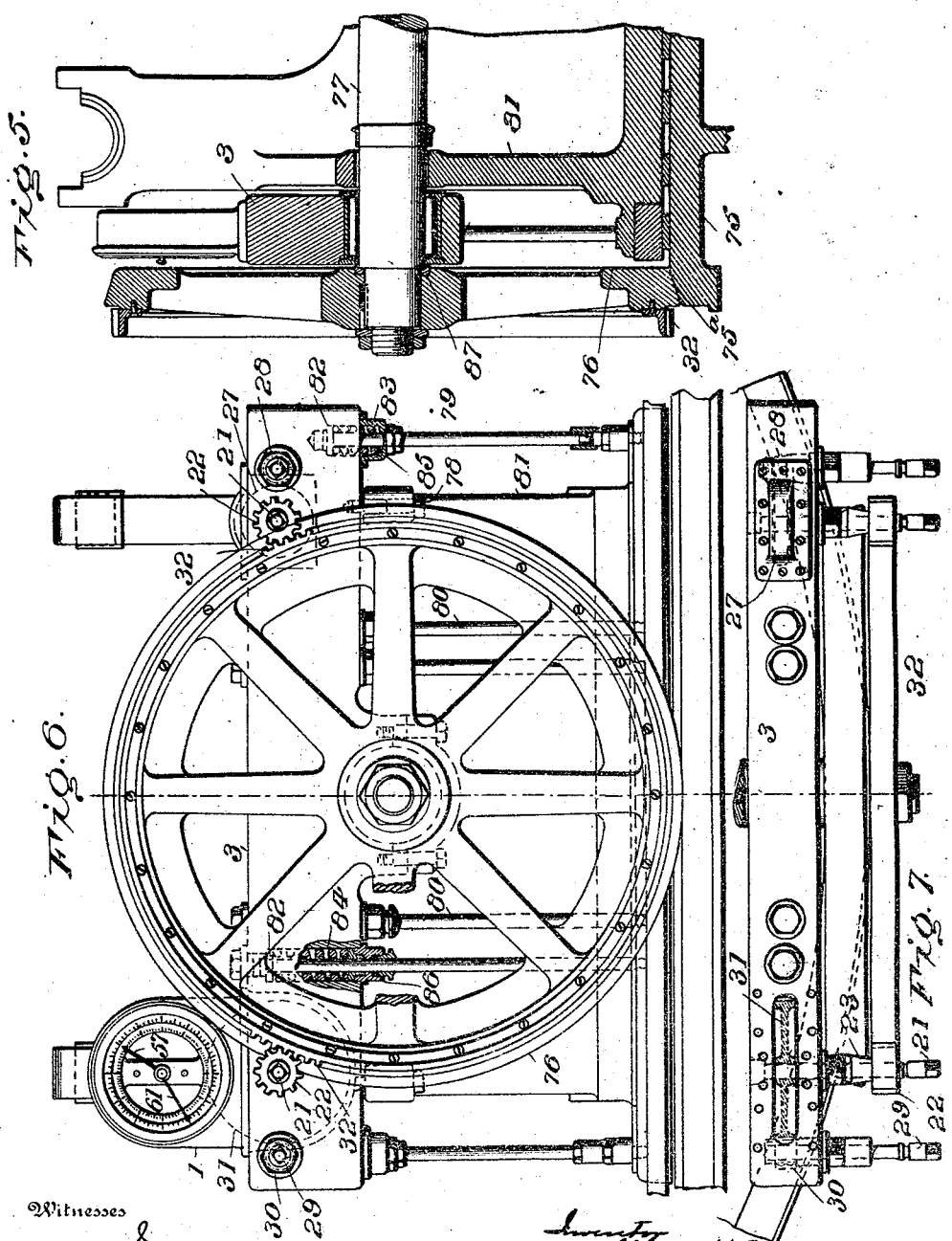

UNITED STATES PATENT OFFICE.

ALBERT H. EMERY, OF STAMFORD, CONNECTICUT.

GUN-CARRIAGE TRAVERSE-INDICATOR.

SPECIFICATION forming part of Letters Patent No. 669,898, dated March 12, 1901.

Original application filed November 1, 1900, Serial No. 35,133. Divided and this application filed February 1, 1901. Serial No. 45,615. (No model.)

*To all whom it may concern:*

Be it known that I, ALBERT H. EMERY, a citizen of the United States, residing at Stamford, in the county of Fairfield and State of Connecticut, have invented certain new and useful Improvements in Gun-Carriage Traverse-Indicators, of which the following is a specification.

This is a division of my application filed November 1, 1900, Serial No. 35,133.

The subject of this invention is an indicator by which the angular rotation of a carriage on which it is mounted or to which it may be connected is shown.

This indicator is intended for use more especially with the carriages of large coast-defense guns and may be mounted on a fixed or permanent seat and so connected with the carriage as to show the angular rotation or traverse of the same, or it may be mounted directly on some part of the carriage and turn with it and be so arranged as to show the angular movement thereof.

The indicator may be connected directly with a wheel which is operated to traverse the carriage and rotate in harmony therewith, or it may be connected with any wheel which rotates in harmony with the angular movement of the carriage when it is traversed, such wheel, if necessary, being added especially for this purpose. If connected directly with the traverse-wheel—that is, a wheel that is driven directly to cause the rotation of the carriage—it will be desirable to have this wheel so constructed and operated that it will not slip when driving the carriage. This may be accomplished by the use of suitable gears gearing the wheel to the bed or other stationary part of the carriage, or it may be done by giving sufficient pressure between the bearing-face of the traverse-wheel and the bed to prevent slipping when this wheel is turned to rotate the carriage. If this is not done, it would be well to connect the traverse-indicator when mounted on the carriage with the bed or some other fixed part of the carriage by an independent wheel connected with the bed and traverse-indicator in such a way that the carriage cannot be traversed without moving the indicator in exact harmony therewith. I prefer this indicator to be rotary and to have its angular movements in exact harmony with the carriage and will illustrate my invention with an indicator so constructed and directly connected to the main traverse-wheel. It might be connected with any wheel that moves in exact harmony with the angular motion of the carriage.

This invention is illustrated in the three sheets of drawings forming part of this specification, and in which—

Figure 1 represents a front elevation of the indicator. Fig. 2 is a vertical section of the same and detail of a piece on which it is mounted and one of the gears by which it is connected to the traverse-wheel. Fig. 3 is an enlarged sectional detail of the main axle of the indicator and the parts carried thereby. Fig. 4 is a detail of the clutch (shown in section in Fig. 3) used to adjust one of the pointers to the zero position. Fig. 5 is a sectional detail showing small portions of the gun-carriage, the bed on which it is traversed, the shaft of the traverse-wheel, the traverse-wheel and its gear, together with the load-beam and its contained bearing, and the traverse-indicator mounted thereon. Fig. 6 is a front elevation of these parts, together with the pinions used to drive the gear of the traverse-wheel, showing also the method of connecting the traverse-wheel to the indicator and the adjoining load-springs arranged in connection with the load-beams to adjust the pressure between the traverse-wheel and the bed to prevent slipping. Fig. 7 is a plan showing a portion of the bed on which the traverse-wheel rests, and the traverse-wheel with the mechanism for driving it, the traverse-indicator being removed and the gear which drives it being shown in dotted section.

In Figs. 1 and 2, 1 represents the main case of the indicator; 2, the screws by which it is connected to the load-beam 3, (better shown in Fig. 2;) 4, a metal ring secured by screws 5 to the case 1; 6, another metal ring secured to the ring 4 by screws 7.

8 is a glass plate held between the rings 4 and 6 by an elastic packing 9.

10 and 11 are, respectively, the front and rear frames which support the internal mechanism of the indicator. To the supporting-frame 10 is secured the casing-ring 12 by the screws 13.

14 is a ring secured by screws 15 to frame 10. This ring has a dial graduated in degrees from "0" to "360." (See Fig. 1.) An inner ring 16 is secured by screws 17 to support 10 and by screws 15ª to ring 14, ring 16 being graduated into equal parts numbered from "0" to "60" to indicate minutes, each minute in turn being divided into four equal parts to show fractions thereof.

Frames 10 and 11 are connected at the top by a rectangular plate 18, to which they are fastened by screws 19, and a similar plate 20, also secured by screws 19, connects them at a point lower down, as shown in Figs. 1 and 2.

21 is a shaft which carries a pinion 22 and may be driven by a crank placed on its outer end. This shaft rests in a support 23, that is screwed into the front side of the load-beam 3 and has a bearing 23ª resting in bushing 24, which is fixed in its seat by screw-cap 24ª. A washer 25 and cap-nut 26, screwed on the inner end of shaft 21, prevents its longitudinal movement. A similar shaft 21 and pinion 22 are mounted in the load-beam 3 at its opposite end, as shown in Fig. 6. This shaft carries a gear 27, operated by pinion 28, by which it may be driven with greater force.

When the carriage is to be traversed slowly by one man, a crank is placed on shaft 29, Figs. 6 and 7, driving the pinion 30 to operate the gear 31. (Shown in section in Fig. 2.) Gear 31 is keyed to shaft 21 and turns with the pinion 22, which drives the traverse-gear 32 (see Figs. 6 and 7) with much more force than when the crank is placed on shaft 21 and at the same time gives much slower steadier motion to bring the carriage to the exact position desired and to be determined by the pointer on the traverse-indicator. Gear 31 meshes with and drives gear 33, Figs. 1 and 2, secured on shaft 34 by screws 35. Gear 33 meshes with and drives gear 36, which is secured by screws 37 to gear 38ª, which has a shaft 38 passing through and supported in frame 10. Gear 38ª meshes with and drives gear 40, secured by screw 41 to the hub of pinion 42, which meshes with and drives gear 43, secured by screw 45 on the hub of a pinion 44. Pinion 42 rests on axle 46, which rests in frames 10 and 11. Pinion 44 rests on shaft 39 and meshes with gear 50, secured by screws 51 to the hub of pinion 52, which turns loosely on shaft 46 and turns gear 53 on its fixed bearing 54, which is secured to the support 11 by cap-nut 55.

The shaft 38 carries at its front end a hub 56 and indicating-needle 57, as seen more clearly in Fig. 3. This hub 56 fits easily on the shaft 38 and is made to turn therewith by use of pressure-screws 58 and friction-pads 59, the latter being made of any suitable material, such as cork or leather.

Resting in the bearing 54 and shaft 38 is the before-mentioned shaft 39, which carries a clutch-hub 60, secured to shaft 39 by the indicator-needle or pointer 61. The hub of gear 53 carries two adjusting-screws 62, which compress spiral springs 63 around headed guiding-stems 64, through which they press the bearing-pieces 65 (made of cork or leather or other suitable material) evenly against the shaft 39 with sufficient force to cause it to turn with the gear 53.

66 is a small pin in the end of shaft 39, with a head 66ª, against which the spiral spring 67 presses with sufficient force to keep the head 66ª resting against its seat in bearing 54.

The relations of the circumference of the traverse-wheel to that of its path on the bed, on which it travels, and the gearing between the traverse-wheel and the indicator and the gearing in the indicator are such that the pointer 61 revolves once per revolution of the carriage, having the same angular rotation as the carriage at all points, so that the graduation pointed out by this needle shows the exact revolution of the carriage in degrees. The relations of the gears in the indicator itself are such that the needle 57 makes one complete revolution for each degree passed over by the needle 61. These two needles thus show the exact position of the carriage in degrees, minutes, and fractions of minutes.

The carriage will have some fixed zero-point at which both needles are set exactly at zero. For this purpose hubs 56 and 60 have their adjoining faces finished to form an interlocking clutch, (see Figs. 3 and 4,) by which hub 60 can be made to turn 56 to set needle 57 at zero. Through the glass plate 8 passes a flanged bushing 68, with a nut 69, by which it is secured, and between the bushing and plate and the nut and plate are packings 70 and in the nut 69 is a packing 71. These packings prevent water from entering the indicator through or around the bushing 68.

72 is a shaft set in bushing 68, on the outer end of which is a nut 73, secured by screw 74, and on its inner end are small clutch-teeth which match recesses in the adjoining face of the hub 60. By pressing firmly against the nut 73 the clutch formed on the adjoining faces of 72 and 60 is brought into play, and by pressing still harder against this spring 67 is compressed sufficiently to allow the clutch between the hubs 56 and 60 to act, when by turning nut 73 needle 57 is quickly turned to zero. A slight backward movement of nut 73 allows spring 67 to disengage the clutch between hubs 56 and 60, with the clutch between 72 and 60 still in mesh, when needle 61 can quickly be turned to zero, nut 73 being then pulled back to throw the clutch between 72 and 69 out of operation, thus leaving both needles set at zero, with the carriage at its loading or starting point, and the needles will then turn in harmony with the carriage and show its true angular position at any point.

Fig. 5 shows a portion of the bed 75, with its conical track 75ª, on which the coned traverse-wheel 76 runs. This wheel is keyed to shaft 77, which may have an inner spherical bearing to take up the thrust caused by the coned faces on the bed and traverse-wheel. This bearing is not shown. The carriage turns around an axis in the center of the bed 75. Shaft 77 has a tightly-fitting roller-bearing in the load-beam 3. Rotation of the traverse-wheel causes the load-beam to move, which in turn moves the carriage by reason of the two vertical dowel-pins 78, screwed through lugs in the carriage and fitted to openings in the load-beam, thus causing the whole carriage to rotate.

Two rods 79 and four rods 80 are secured to the carriage-body 81 at their lower ends and have at their upper ends heads, which rest on washers 82 and compress springs 83 and 84 against collars 85 and 86, secured to the bottom of the load-beam. Through these collars the pressure on the springs is put on the load-beam, by which it is transmitted to shaft 77, and thus mainly to the traverse-wheel, causing it to bear on the bed with sufficient pressure to prevent slipping when it is rotated, as should slipping occur the traverse-indicator will not show the true angular position of the carriage. In any style of carriage where these provisions against slipping are insufficient a separate wheel may be provided to roll on the bed or some other stationary part of the carriage and then have the indicator mechanism geared to it instead of to the traverse wheel or mechanism.

Shaft 77 is fixed against longitudinal motion by the spherical bearing at its inner end. It carries a ring 87 against a shoulder near its outer end. Between this ring and the bottom of the recess in the hub of the wheel 76 may be placed thin rings or plates to carefully adjust the distance of the traverse-wheel from the center of the carriage, so that one revolution of the carriage will give exactly one revolution of the indicator-needle 61.

Having thus described my invention, what I claim, and desire to secure by Letters Patent, is—

1. In combination with a gun-carriage rotating about a vertical axis, a traverse-indicator for said carriage comprising rotary indicating mechanism constructed to receive motion from and driven by the angular movement of the carriage about its vertical axis, a pointer driven by said mechanism with the exact angular movement of the carriage, and another pointer having a greater angular movement than that of the carriage.

2. In combination with a gun-carriage rotating about a vertical axis, a traverse-indicator for said carriage receiving motion from and driven by the angular movement of the gun-carriage, and comprising two pointers with corresponding graduated arcs one of which pointers shows on its graduated arc the exact angular movement of the carriage, while the other pointer moves through a complete revolution for each angular division traversed by the first-named pointer, and shows the fractional portions of the division being passed over by the said first pointer.

3. In combination with a gun-carriage rotating about a vertical axis, a traverse-indicator for said carriage comprising a shaft 39, sleeve 38 around said shaft, pointer-hubs 60 and 56 on said shaft and sleeve, pointers 61 and 57 on said hubs and suitable mechanism driven by the angular movement of the carriage transmitting to the shaft 39 the exact angular movement of the carriage and to the sleeve 38, a greater angular movement.

4. In combination with a gun-carriage rotating about a vertical axis, a traverse-indicator for said carriage comprising a shaft 39, sleeve 38 around said shaft, pointer-hubs 60 and 56 on said shaft and sleeve, pointers 61 and 57, suitable mechanism driven by the angular movement of the carriage transmitting to the shaft 39 the exact angular movement of the carriage, and to the sleeve 38 a greater angular movement, and suitably-interposed frictional driving connections to allow the pointers to be set at any desired reading.

ALBERT H. EMERY.

Witnesses:
JNO. R. ADAMS,
HERVEY S. KNIGHT.